(12) United States Patent
Burk

(10) Patent No.: US 6,487,799 B2
(45) Date of Patent: Dec. 3, 2002

(54) REMOVABLE HITCH ATTACHMENT FOR EARTH-MOVING EQUIPMENT

(76) Inventor: Darrell Burk, 10725 NE. San Rafael, Portland, OR (US) 97220

( * ) Notice: Subject to any disclaimer, the term of this patent is extended or adjusted under 35 U.S.C. 154(b) by 0 days.

(21) Appl. No.: 09/864,629

(22) Filed: May 23, 2001

(65) Prior Publication Data

US 2001/0046434 A1 Nov. 29, 2001

Related U.S. Application Data

(60) Provisional application No. 60/206,998, filed on May 24, 2000.

(51) Int. Cl.[7] .................................................. E02F 3/76
(52) U.S. Cl. .......................................... 37/403; 37/903
(58) Field of Search ........................... 37/403, 405, 407, 37/466, 468, 903; 414/724, 914, 912, 607, 785, 462; 280/415.1, 478.1

(56) References Cited

U.S. PATENT DOCUMENTS

| | | |
|---|---|---|
| 4,037,681 A | 7/1977 | Gorby |
| 5,097,609 A | 3/1992 | Swaggert |
| 5,570,897 A | 11/1996 | Wass |
| 5,833,008 A * | 11/1998 | Reed et al. .................. 171/141 |
| 6,022,184 A * | 2/2000 | Friedland .................... 414/724 |
| 6,135,701 A * | 10/2000 | Galloway, Sr. .............. 414/607 |

* cited by examiner

Primary Examiner—Robert E. Pezzuto
(74) Attorney, Agent, or Firm—Kolisch Hartwell, P.C.

(57) ABSTRACT

A removable hitch attachment configured to couple a towable vehicle to the bucket of a piece of earth-moving equipment, the bucket having wall portions terminating in edges that define an opening of the bucket. The removable hitch attachment includes a hitch mount configured to permit mounting of a hitch onto the removable hitch attachment. The removable hitch attachment further includes an edge engaging structure configured to receive one of the edges of the bucket to secure the hitch mount to the bucket. The edge engaging structure is further configured to secure the removable hitch attachment to the bucket independent of engagement with the other edges of the bucket and free of any structural modification of the bucket.

17 Claims, 3 Drawing Sheets

REMOVABLE HITCH ATTACHMENT FOR EARTH-MOVING EQUIPMENT

RELATED APPLICATION

This application claims priority to co-pending U.S. Provisional Patent Application Serial No. 60/206,998, which was filed on May 24, 2000, is entitled "Removable Hitch Attachment for Earth-Moving Equipment," and the complete disclosure of which is hereby incorporated by reference.

FIELD OF THE INVENTION

The present invention relates to earth-moving equipment, and more particularly to a hitch attachment that is removably mountable on earth-moving equipment.

BACKGROUND OF THE INVENTION

Operators of earth-moving equipment and other construction equipment often need to move trailers and similar non-powered towable vehicles around a job site. While these towable vehicles have hitch couplings for attachment to a drive vehicle such as a truck, most pieces of earth-moving equipment do not include the mating hitches to attach to the towable vehicles. As a result, it can be difficult to move the towable vehicle with the earth-moving equipment. Typically, an operator will attach the towable vehicle to the earth-moving equipment using a chain.

Prior attempts to provide a towing capability to earth-moving equipment have involved structural changes to the bucket of the earth-moving equipment which are often permanent, or have involved complex assemblies attached at multiple locations on the equipment.

SUMMARY OF THE INVENTION

The present invention provides a removable hitch attachment configured to operatively couple a towable vehicle with a bucket of a piece of earth-moving equipment, where the bucket has wall portions terminating in two or more generally linear edges that define an opening of the bucket. The removable hitch attachment includes a hitch mount configured to permit mounting of a hitch onto the removable hitch attachment and an edge engaging structure configured to secure the hitch mount to the bucket. The edge engaging structure is configured to receive one of the edges of the bucket to secure the removable hitch attachment to the bucket, and is further configured to secure the removable hitch attachment to the bucket independent of engagement with the other edges of the bucket and free of any structural modification of the bucket. In addition, the removable hitch attachment is configured to be easily installed onto and removed from the bucket to selectively accommodate towing operations and earth-moving operations.

DISCLOSURE OF THE INVENTION

Figure 1:
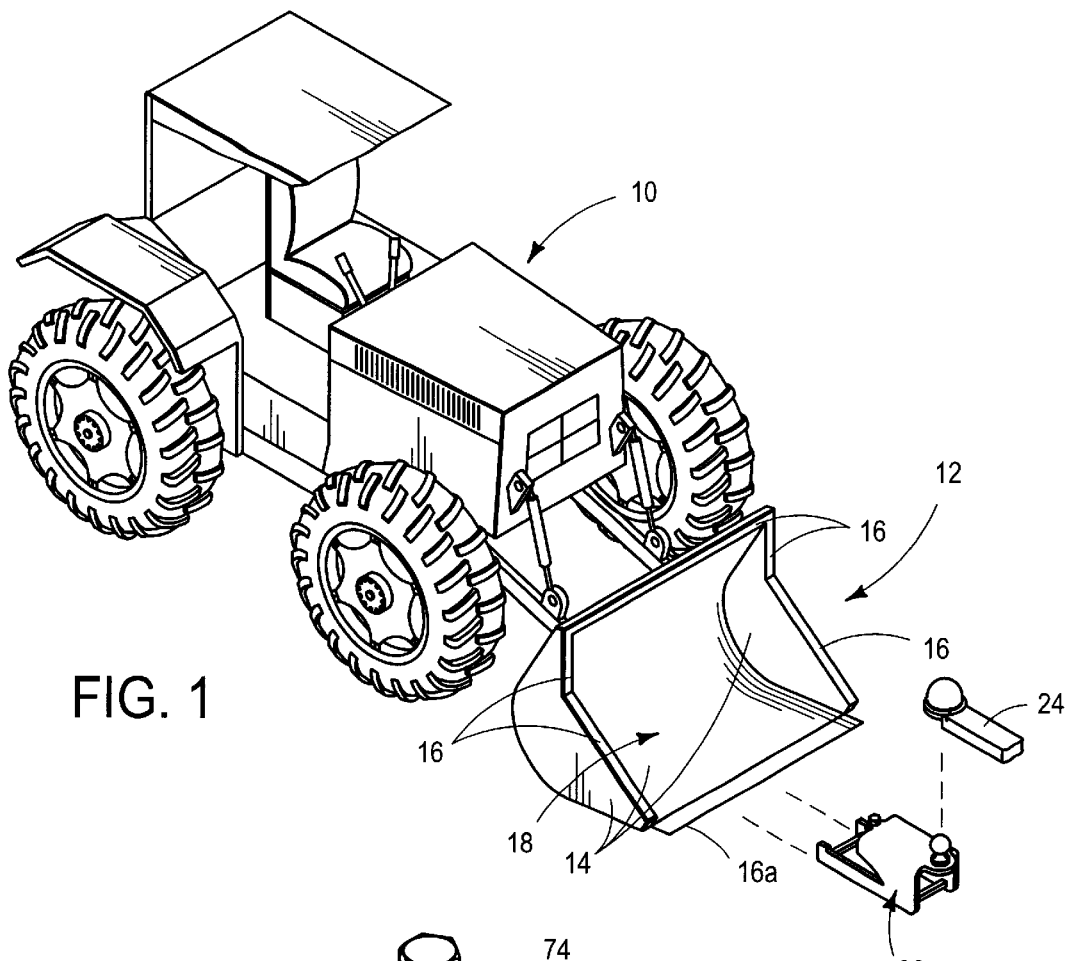
FIG. 1 is an isometric view depicting a piece of earth-moving equipment, a portion of a towable vehicle, and a hitch attachment according to the present invention for coupling the earth-moving equipment with the towable vehicle.

The invention is a removable hitch attachment for the buckets of earth-moving equipment such as front-end loaders, dozers, backhoes, etc. FIG. 1 shows an exemplary piece of earth-moving equipment 10 including a bucket 12 used to perform various functions. As used herein, the term "bucket" refers to any blade, scoop, shovel, bucket or like implement associated with a piece of earth-moving equipment, and thus includes front loader buckets, bucket excavators, backhoe buckets, shovels, dozer blades, slip scoops, etc. The term also includes snow scoops, throwers and other snow moving implements.

Figure 5:
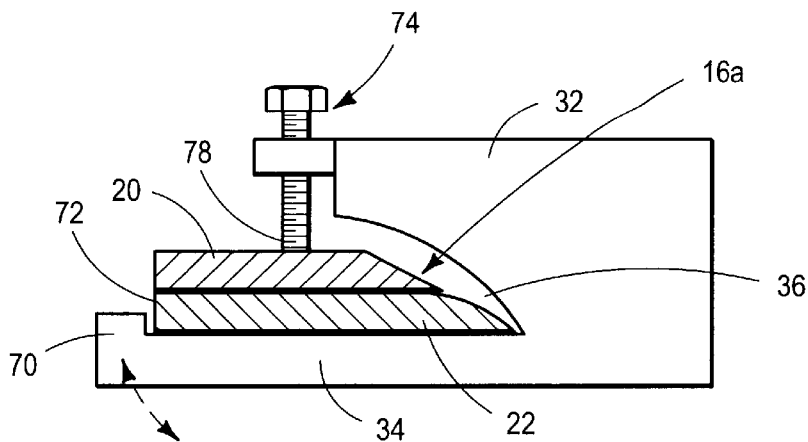
FIGS. 5–8 are side views depicting additional embodiments of a hitch attachment according to the present invention, as mounted on a bucket edge of a piece of earth-moving equipment.

As is typical with buckets generally, depicted bucket 12 is formed as a walled structure, including wall portions 14 that terminate in a number of generally linear edge regions 16 which define opening 18 of the bucket. At the lower front end of bucket 12, bucket edge 16a includes a welded cutting edge or blade 20, as best seen in FIG. 5. Bucket edge 16a may also includes an optional bolt-on cutting edge 22 removably attached to the underside of welded cutting edge 20 by a plurality of bolts passing through both the welded cutting edge and the bolt-on cutting edge. As is well known to those of skill in the art, bucket 20 may be attached to earth-moving equipment 10 so that it is selectively movable (e.g., vertically, tilt, etc.) to perform a variety of functions such as digging, lifting, scooping, carrying, pushing, etc.

FIG. 1 further depicts a hitch mating portion 24 of a towable vehicle, and a removable hitch attachment 26 in accordance with the present invention. Hitch attachment 26 operatively couples earth-moving equipment 10 with the towable vehicle via attachment to bucket 12. Hitch attachment 26 may be used to move a wide variety of vehicles and equipment, including trailers, wagons, compressors, light stands, etc. As will be explained in further detail, attachment 26 is easily attached to and removed from bucket 12 to readily accommodate towing operations or other operations (e.g., the earth-moving operations for which equipment 10 is primarily designed), as desired.

In addition to the hitch attachment shown in FIG. 1, various configurations of a removable hitch attachment according to the invention are described with reference to FIGS. 2–8. The description herein shall apply to all of the configurations unless otherwise indicated. As will be seen, some of the configurations are described as mounting to a bucket edge having both a welded cutting edge and a bolt-on cutting edge attachment, while others are shown mounted to a bucket edge without the bolt-on attachment. The present invention includes hitch attachments for use in either configuration, i.e. with or without an added cutting edge attachment. More generally, those skilled in the art will appreciate that a hitch attachment according to the present invention may be configured for use on any type of bucket and earth-moving equipment. Further, as will be seen, the hitch attachment may include various adjustment features, permitting mounting of the hitch attachment on a variety of bucket edge types and sizes.

Figure 2:
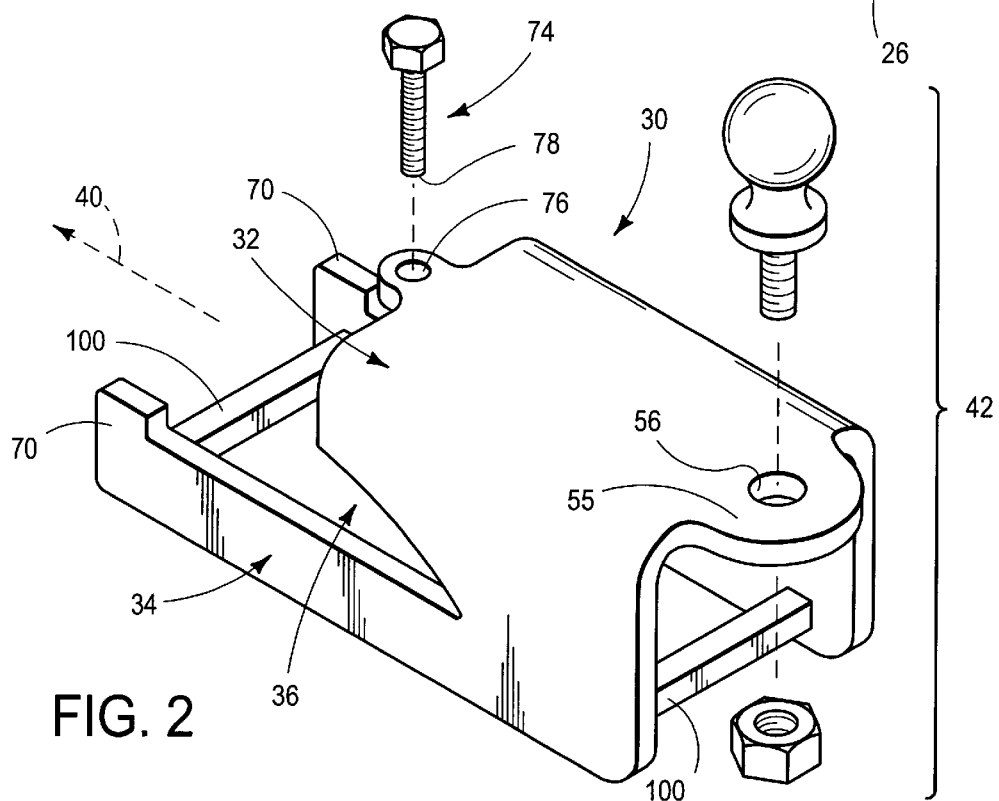
FIG. 2 is an isometric view depicting a hitch attachment similar to that shown in FIG. 1.

Turning now to FIG. 2, a removable hitch attachment 30 according to the invention is depicted in greater detail. Hitch attachment 30 includes an upper member 32 adapted to engage the top of a bucket edge of a piece of earth-moving equipment such as that depicted in FIG. 1. Upper member 32 is coupled to a lower member 34 adapted to engage the bottom of the bucket edge. In the depicted embodiment, the upper and lower members are generally opposed to one another, and cooperate to form an opening 36. Opening 36 is adapted to receive and fit on the bucket edge, which typically is the lower front edge of the bucket. Opening 36 may be a slot, mouth, cavity or the like, which is defined through the body of the hitch attachment and configured to receive the bucket edge.

Hitch attachment 30 typically is engaged with a bucket edge (e.g. bucket edge 16a) by aligning opening 36 with the bucket edge and then moving attachment 30 in direction 40 toward the bucket so that the tip of the bucket edge moves into and is received within opening 36, as will be more fully explained below. Often it will be desirable to form opening 36 with an angular shape to conform generally to the bevel of bucket edge 16a, as best seen in the embodiments shown in FIGS. 5–8.

Figure 3:
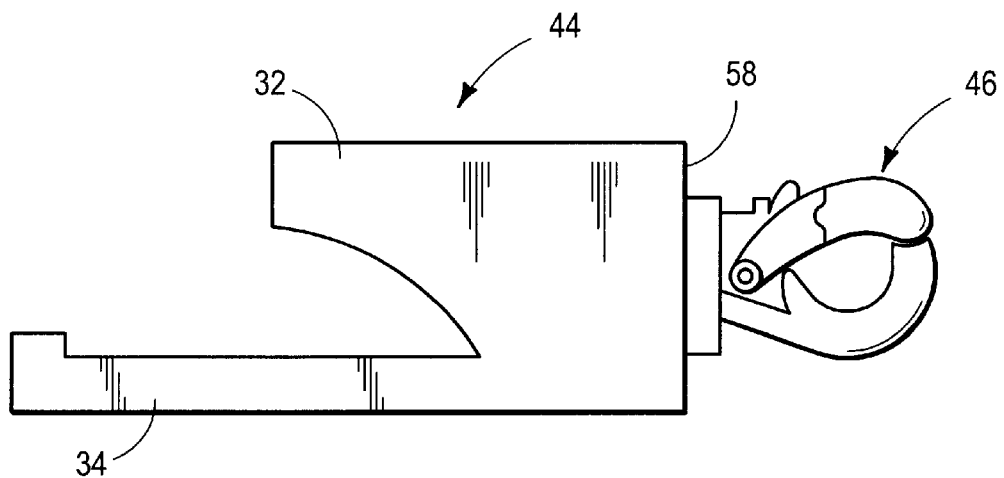
FIG. 3 is a side view of another hitch attachment according to the present invention, including a pinnel type hitch.
Figure 4:
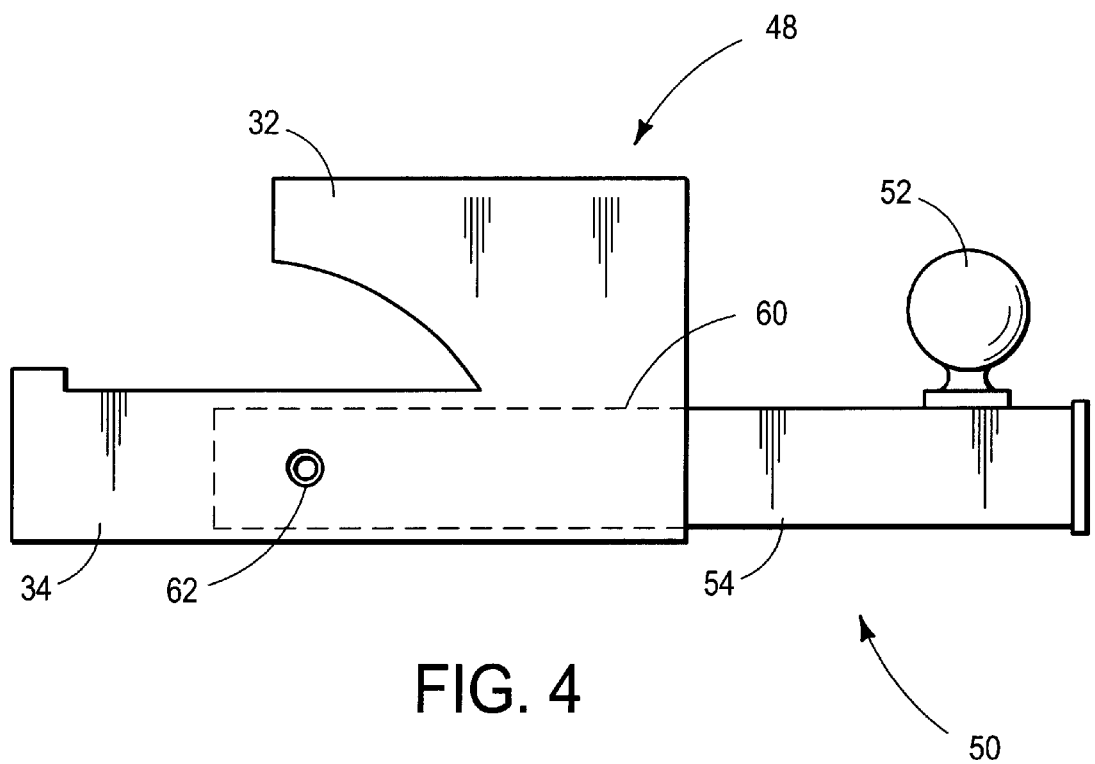
FIG. 4 is a side view of yet another hitch attachment according to the present invention, including a receiver type hitch.

As seen in FIGS. 2–4, various types of hitches may be secured to the body of a hitch attachment constructed in accordance with the present invention. FIG. 2 depicts a ball type hitch 42; FIG. 3 depicts a hitch attachment 44 with a pinnel type hitch 46; and FIG. 4 depicts a hitch attachment 48 with a receiver type hitch 50 including a ball hitch 52 mounted on a receiver tube 54. The hitch attachments of the present invention may be configured for use with these and a wide variety of other hitch types.

As seen in FIGS. 2–4, the hitch may be secured to the body of the hitch attachment using various structures and securing locations, which are referred to herein generally as "hitch mounts." The hitch mount may include a mounting plate, hole, mounting surface, socket, etc., in various locations, to permit mounting of a hitch onto the hitch attachment body. For example, the hitch attachment of FIG. 2 includes a plate member 55 at the front of upper member 32. A hole 56 is defined through plate member 55, to permit mounting of ball type hitch 42 on the body of the hitch attachment. The hitch attachment of FIG. 3 includes a mounting surface 58 on the front face of the hitch attachment body. Pinnel type hitch 46 may be secured to mounting surface 58 via welding, bolts, or other suitable securing methods. The hitch attachment of FIG. 4 includes a hitch mount in the form of a socket 60 configured to receive tube 54, which conforms in shape to the socket and is part of receiver type hitch 50. Where the hitch mount is configured for use with such a receiver type hitch, a hole 62 typically is provided to permit insertion of a retainer pin transversely into socket 60 to retain the receiver tube in its inserted position.

Regardless of the hitch type, it will be desirable in some cases that the hitch be integral with the rest of the hitch attachment. In such a case, "hitch mount" refers to the location on the hitch attachment body to which the hitch is secured. For example, where a ball type hitch is provided integrally with the rest of the removable hitch attachment, the hitch mount is at the point where the base or stem of the ball is connected to the rest of the removable hitch attachment. The hitch attachments shown in FIGS. 5–8 do not depict particular hitch types or hitch mounts, however any combination of the hitch types, hitch mounts and mounting locations described above may be employed.

Figure 6:
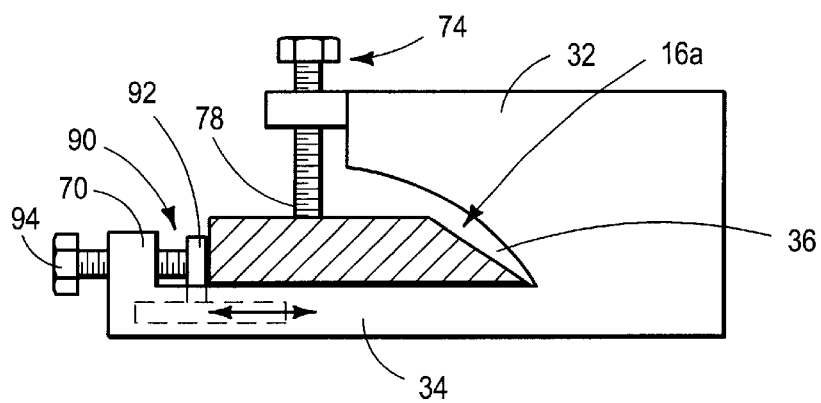
Figure 7:
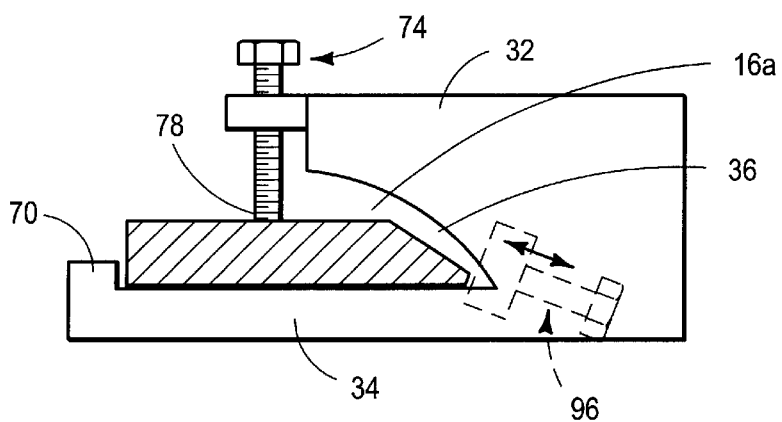
Figure 8:
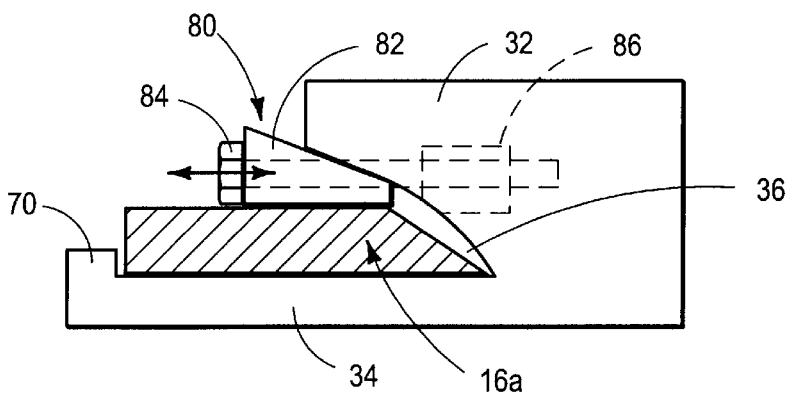

Referring now to FIGS. 2 and 5–8, various structures configured to adjust the hitch attachment and/or retain the hitch attachment on a bucket will be described. First, as seen in these figures, one or more protrusions 70 may be provided at the end of lower member 34. When the hitch attachment is placed on the edge of a bucket, the protrusions and a portion of the bucket cooperate to prevent or inhibit removal of the hitch attachment. Specifically, as seen in FIG. 5, end 72 of bolt-on cutting edge 22 forms a lip that blocks protrusion 70 from moving to the right, thus preventing removal of the depicted hitch attachment from bucket edge 16a. FIGS. 6–8 similarly show gripping of a bucket edge 16a with a protrusion 70 or like structure, but in the context of a bucket edge having only a welded cutting edge and no additional bolt-on cutting edge. As indicated, even where a bolt-on cutting edge is not used, the bucket typically includes a lip spaced from the tip of the bucket edge which can be gripped by the hitch attachment.

As seen in FIGS. 2 and 5–8, the hitch attachment may additionally, or alternatively, include a clamping or other tightening mechanism configured to tighten the hitch attachment and/or cause bucket edge 16a to be retained between upper and lower members 32 and 34. Specifically, as seen in FIGS. 2 and 5–7, the clamping mechanism may include a bolt 74 or similar mechanical fastener configured to press down on the top of bucket edge 16a. Bolt 74 is engaged within a threaded hole 76 provided toward the rear end of upper member 32. Selective rotation of bolt 74 causes bolt end 78 to move toward or away from the top side of bucket edge 16a. When the bolt is tightened, the bucket edge is clamped and held in place between upper and lower members 32 and 34. The clamping also causes the protrusion(s) (e.g., protrusion 70 shown in FIG. 5) to be drawn toward the bottom side of bucket edge 16a into a position in which the protrusions and lip 72 interact to prevent removal of the hitch attachment from bucket edge 16a.

Instead of, or in addition to bolt 74, clamping or tightening may be effected through use of a wedge type clamping device 80, as seen in FIG. 8. Clamping device 80 includes a wedge 82 which is positioned between the received bucket edge 16a and upper member 32 of depicted hitch attachment. Wedge 82 is movable into and out of opening 36 via rotation of wedge bolt 86, the end of which is received by a threaded component 86 positioned within the body of the depicted hitch attachment. Tightening wedge bolt 84 causes wedge 82 to move to the right, creating a clamping force which acts upon bucket edge 16a to aid in maintaining the bucket edge in its received position between upper and lower opposed members 32 and 34. Regardless of the particular structure used, clamping or tightening will often be desirable to accommodate bucket edges of different sizes and to maintain the hitch attachment securely on a given bucket edge.

The hitch attachment member may include adjustment or tightening mechanisms having various other configurations. For example, as seen in FIG. 6, the hitch attachment member may include an adjustable assembly 90 to the rear of lower member 34. Assembly 90 includes an adjustable stop 92, which performs a function similar to the protrusions shown in FIGS. 2, 5, 7 and 8, but which is adjustable via operation of a bolt 94 provided through a threaded hole in protrusion 70. Additionally, or alternatively, a similarly configured adjustment assembly 96 may be provided toward the front of the hitch attachment, as shown in FIG. 7. Assembly 96 provides adjustment and tightening through engagement with the tip of bucket edge 16a. Regardless of the particular configuration, these mechanisms accommodate bucket edges of different sizes and, for a given bucket, allow a tight fit to be maintained as the bucket edge wears down from normal wear and tear.

The various mechanisms described above may be used alone or in various combinations. The depicted configurations are intended to be illustrative only, and the invention may include other configurations. For example, protrusion 70 is depicted in all of the embodiments as being employed in combination with certain another components that aid in maintaining the hitch attachment in place on the bucket edge. However, protrusion 70 may be used alone to grip a bucket edge, without any of the tightening, clamping, or adjusting devices described above. Indeed, in many cases, downward forces exerted on the front of the hitch attachment (e.g., as a result of coupling with a towable vehicle) will be sufficient to cause the rear of the hitch attachment to pivot upwards towards the bottom of the bucket edge, thus engaging protrusion 70 with lip formed by bucket edge 16a.

The hitch attachments of the present invention may be constructed out of any material suitable for gripping a bucket edge and supporting the load of a towable vehicle. Typically, the hitch attachment is constructed of steel or some other metal. The attachment may be formed as a single shaped piece as shown in FIG. 2 or may be formed from several separate pieces. In the latter case, the separate pieces are secured together by suitable means such as welding, bolting, etc. Often it will be desirable to form the attachment to be relatively hollow, as in FIG. 2, though the hitch attachment may be formed to have a more solid construction thruoughout. With relatively hollow constructions, one or more stabilizer bars 100 may be employed to reinforce the hitch attachment, as shown in FIG. 2.

From the above, it should be appreciated that the hitch attachment may be mounted on a bucket edge by positioning the hitch attachment so that opening 36 is aligned with the bucket edge on which the attachment is to be placed. The hitch attachment is then moved toward the bucket until bucket edge 16a is received in the opening. The rear of the attachment is then pivoted upward about the bucket edge (pivoting motion is indicated in dashed lines on FIG. 5) until protrusion(s) 70 is/are in a position to engage and grip the lip 72 formed by welded cutting edge 20 and/or bolt-on cutting edge 22. Instead of, or in addition to this pivoting, the various clamping, tightening and adjustment mechanisms described above may be operated to ensure that the hitch attachment is maintained in place on the bucket edge. As discussed above, these mechanisms may be configured so that, where protrusions are used, operation of the mechanisms causes the hitch attachment to be drawn tightly into contact with the underside of the bucket edge into a position in which the protrusions engage the lip formed near the bucket edge. In any event, once the hitch attachment is securely in place on bucket edge 16a, it is then ready for use as shown in FIGS. 5–8.

The earth-moving equipment and/or the towable vehicle may then be operated to engage the hitch with mating hitch 24, as shown in FIG. 1. The hitch attachment is securely mounted on the bucket edge and thus may be used for towing (pulling), pushing, swiveling or otherwise moving the towable vehicle. After the towable vehicle is moved to a desired location, the hitch and mating hitch are disengaged. Following the towing operation, the hitch attachment may be removed from bucket 12 as desired prior to performing other operations with the earth-moving equipment.

As described various configurations above, the hitch attachment provides a reliable and easily mountable attachment for towing vehicles with earth-moving equipment. Further, an attachment according to the invention may be used to couple brooms and other non-hitch devices to a piece of earth-moving equipment. The hitch attachments described above do not require structural modification to earth-moving equipment such as holes introduced through the bucket or welding of material to the bucket. Modifications such as these can structurally weaken the bucket and/or interfere with normal operation of the earth-moving equipment. In addition, the embodiments described above provide for a secure connection to the bucket without requiring complicated structures connected to the bucket at multiple attachment points. For example, the hitch attachment shown in FIG. 1 engages bucket 12 at only one of edges 16 (e.g. bucket edge 16a), and is securely attached to the bucket free of engagement with any of the other edges. As a result, the hitch attachment may be quickly and easily attached to and removed from the bucket.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A removable hitch attachment configured to operatively couple a towable vehicle with a bucket of a piece of earth-moving equipment, the bucket having wall portions terminating in two or more generally linear edges that define an opening of the bucket, the removable hitch attachment comprising:

a hitch mount configured to permit mounting of a hitch onto the removable hitch attachment; and an edge engaging structure configured to secure the hitch mount to the bucket, where the edge engaging structure includes:

upper and lower opposed members configured to receive one of the edges of the bucket therebetween; and a clamping mechanism configured to maintain the edge of the bucket received between the upper and lower opposed members, where the removable hitch attachment is configured to be secured to the bucket free of structural modification to the bucket, and to be easily installed onto and removed from the bucket to selectively accommodate towing operations and earth-moving operations.

2. The removable hitch attachment of claim 1, where the edge engaging structure is configured to secure the hitch mount to the bucket independent of the removable hitch attachment engaging any of the other edges that define the opening of the bucket.

3. The removable hitch attachment of claim 1, where the hitch mount is configured to perm it mounting of a pinnel type hitch onto the removable hitch attachment.

4. The removable hitch attachment of claim 1, where at least one of the upper and lower opposed members includes an inward extending protrusion configured to engage a lip formed adjacent the edge of the bucket to maintain the edge of the bucket received between the upper and lower opposed members.

5. The removable hitch attachment of claim 4, where the clamping mechanism is configured so that tightening the clamping mechanism causes the protrusion to be drawn into a position in which the lip blocks the protrusion to inhibit disengagement of the edge engaging structure and bucket.

6. The removable hitch attachment of claim 1, where the hitch mount is configured to permit mounting of a ball type hitch onto the removable hitch attachment.

7. The removable hitch attachment of claim 1, where the hitch mount includes a socket configured to permit mounting of a receiver type hitch onto the removable hitch attachment.

8. A removable hitch attachment configured to operatively couple a towable vehicle with a bucket of a piece of earth-moving equipment, the bucket having wall portions terminating in two or more generally linear edges that define an opening of the bucket, the removable hitch attachment comprising:

a hitch mount configured to permit mounting of a hitch onto the removable hitch attachment; and an edge engaging structure configured to receive one of the edges of the bucket and secure the hitch mount to the bucket, where the removable hitch attachment is configured to be secured to the bucket fee of structural modification to the bucket and the independent of engagement with the other edges of the bucket, and to be easily installed onto and removed from the bucket to selectively accommodate towing operations and earth-moving operations.

9. The removable hitch attachment of claim 8, where the edge engaging structure includes a slot configured to receive the edge of the bucket therein.

10. The removable hitch attachment of claim 9, where the edge engaging structure includes a clamping mechanism configured to selectively maintain the edge of the bucket in the slot.

11. The removable hitch attachment of claim 9, where the edge engaging structure includes a protrusion on one side of the slot that extends inward, the protrusion being configured to engage a lip formed adjacent the edge of the bucket to maintain the edge of the bucket in the slot.

12. The removable hitch attachment of claim 9, where the edge engaging structure includes upper and lower members that at least partly bound the slot, and where at least one of the upper and lower members includes an inward extending protrusion configured to engage a lip formed adjacent the edge of the bucket to maintain the edge of the bucket in the slot.

13. The removable hitch attachment of claim 8, where the edge engaging structure includes a clamping mechanism configured to hold the removable hitch attachment in place on the bucket.

14. The removable hitch attachment of claim 8, where the edge engaging structure includes a pair of opposed members configured to receive and grip the bucket edge therebetween.

15. The removable hitch attachment of claim 8, where the hitch mount is configured to permit mounting of a ball type hitch onto the removable hitch attachment.

16. The removable hitch attachment of claim 8, where the hitch mount includes a socket configured to permit mounting of a receiver type hitch onto the removable hitch attachment.

17. The removable hitch attachment of claim 8, where the hitch mount is configured to permit mounting of a pinnel type hitch onto the removable hitch attachment.

* * * * *